United States Patent Office 3,330,200
Patented July 11, 1967

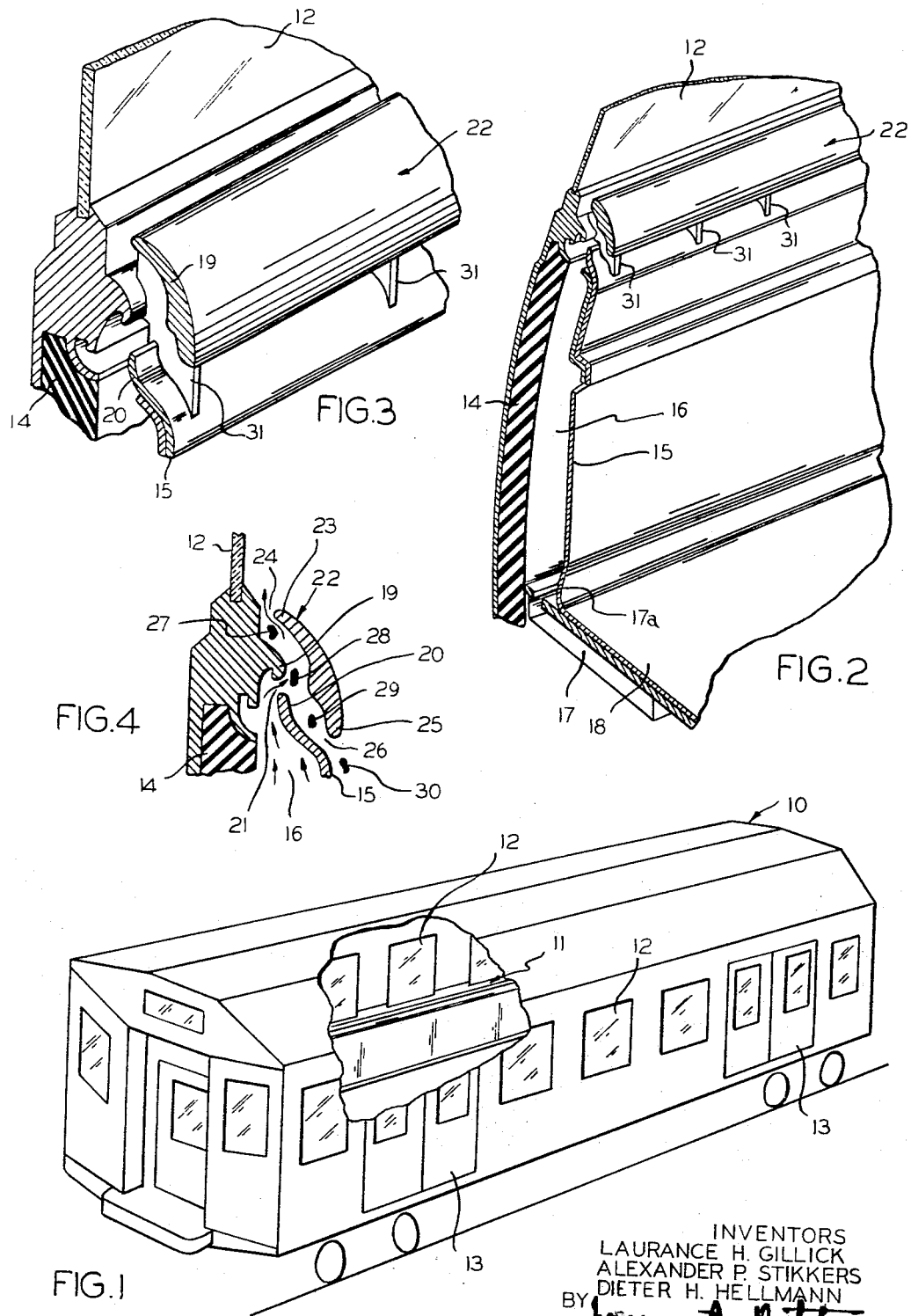

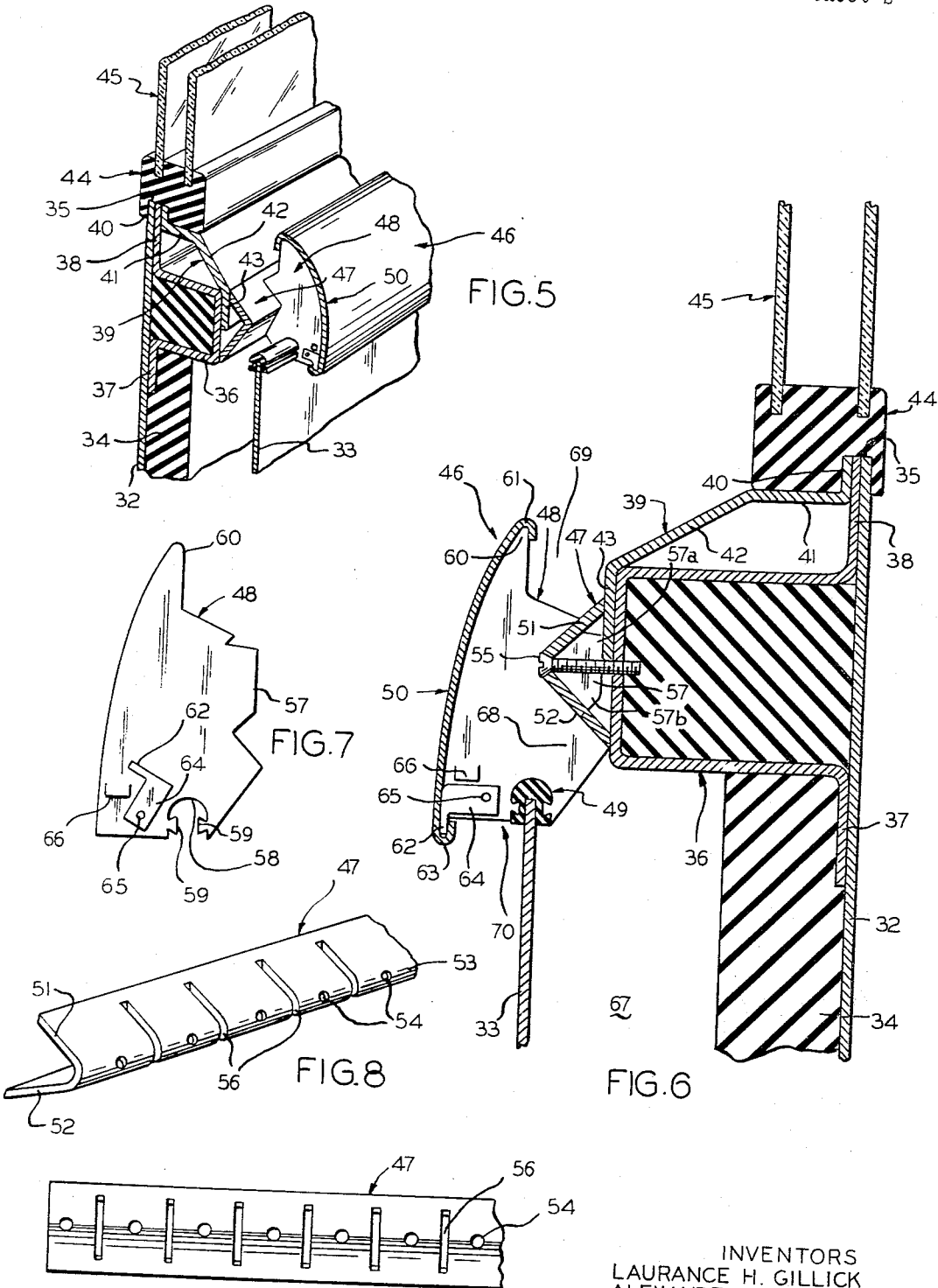

3,330,200
SILL STRUCTURE FOR VEHICLE
Laurance H. Gillick, Wilmette, and Alexander P. Stikkers, Elgin, Ill., and Dieter H. Hellmann, Pierfonds, Quebec, Canada, assignors to Vapor Corporation, Chicago, Ill., a corporation of Delaware
Filed Oct. 19, 1965, Ser. No. 498,056
10 Claims. (Cl. 98—13)

ABSTRACT OF THE DISCLOSURE

Vehicle window sill structure coacting with an air discharge opening of an air distribution system constructed to prevent foreign elements dropped into the air discharge opening from entering the air distribution system.

---

This invention relates in general to a window sill structure for vehicles having an air distributing system, and more particularly to a window sill structure arranged interiorly of a vehicle and coacting with an air discharge opening of an air distribution system wherein it is desired to eliminate the possibility of foreign elements being introduced into the air distribution system to disrupt operation thereof, and still more particularly to a window sill structure especially adapted for use in passenger carrying vehicles having an air distribution system, although other uses and purposes may be apparent to one skilled in the art.

The present invention, while shown and described as applicable to passenger vehicles generally operable as railroad vehicles, equally applies to motor vehicles or aircraft. Heretofore, passenger carrying vehicles with air distribution systems have quite often employed air discharge outlets or openings along the lower edges of windows in the vehicle at seating height of a passenger and therefore at locations accessible to passengers. Such positioning of air discharge outlets and openings is desirable so that the window area and side walls of the vehicle adjacent thereto can be blanketed with the discharge of air which is normally conditioned to control the air temperature within the vehicle. This necessitates a proper air discharge outlet or opening, and it has been found that certain passengers will inadvertently or otherwise cause foreign elements, such as paper, gum and other refuse, to enter the opening, all of which can and sometimes does interfere with the output of air, thereby disrupting the ventilation or conditioning of air temperature within the vehicle, or possibly result in developing odors within the conditioned space.

It is therefore an object of the present invention to provide a window sill structure that will obviate the above named difficulties, and thereby prevent the introduction of foreign elements into an air discharge opening or outlet or an air distribution system.

Another object of this invention is in the provision of a window sill structure for passenger carrying vehicles having air distribution systems and air outlets, which structure will prevent the introduction of foreign elements into the outlets and which structure can be easily and economically constructed.

A further object of this invention resides in the provision of a window sill structure coacting with an opening that discharges air within a vehicle, and which structure includes an air discharge opening and a further opening for passing of foreign elements introduced into the air discharge opening to the floor of the vehicle.

Other objects, features and advantages of the invention will be apparent from the following detailed disclosure, taken in conjunction with the accompanying sheets of drawings, wherein like reference numerals refer to like parts, in which:

FIG. 1 is a diagrammatic perspective view of a vehicle, with parts broken away and other parts omitted and which is provided with the window sill structure of the present invention;

FIG. 2 is a cut-away enlarged perspective view of a part of the vehicle shown in FIG. 1, with some parts shown in section and others shown in full view and illustrating in more detail the present invention;

FIG. 3 is a still further enlarged view of the window sill structure of the present invention as cut away from the view of FIG. 2;

FIG. 4 is a transverse sectional view of the window sill structure shown in FIGS. 2 and 3;

FIG. 5 is a view similar to FIG. 3 but showing another embodiment of the invention;

FIG. 6 is an enlarged transverse sectional view taken through the window sill structure in accordance with the embodiment of FIG. 5;

FIG. 7 is an elevational view of one of the web plates employed in the embodiment of FIGS. 5 and 6;

FIG. 8 is a perspective view of the V-shaped mounting bar employed in the embodiment of FIGS. 5 and 6; and FIG. 9 is a front elevational view of the V-shaped bar of FIG. 8.

Referring now to the drawings, and particularly to FIG. 1, a passenger carrying rail vehicle 10 is shown in FIG. 1 having a window sill structure 11 according to the present invention mounted along one of the side walls thereof, it being understood that a similar structure would be mounted along the opposite side wall. The vehicle 10 includes front, back and side walls, a floor and a ceiling, with a plurality of windows 12 in each of the side walls. The window sill structure would extend along the windows but not along the sides of the car in the area of the doors 13.

The window sill structure would be applicable to any vehicle where the side walls would be constructed to include air ducts or the like for discharge of air upwardly along the side walls through openings or outlets arranged below the windows 12 and generally at the lower ends of the windows as illustrated in the drawings. A side wall including such an air duct arrangement, as shown in FIGS. 2, 3 and 4, would include an outer wall 14 and an inner wall 15 that would define therebetween an air duct 16. A supply of air to the air duct may be provided by any suitable means such as an air duct 17 extending along a side of the vehicle and below the floor 18, which air duct would have an opening 17a permitting air to be delivered into the air duct 16 within the side wall structure. In the embodiment of FIGS. 2, 3 and 4, a lip or member 19 projects inwardly and extends longitudinally from the outer wall 14 to coact with the upper end 20 of the inner wall 15 so as to define an elongated, slotted opening 21 that functions as an air discharge opening or outlet for air that is supplied from the air duct 16. The lip 19 is positioned above the upper end 20 of the inner wall so that the air discharge through the opening is directed toward the center of the vehicle.

An elongated rail 22 is mounted along the opening 21 and in spaced relation therefrom. The rail 22 includes an upper portion 23 which extends above the opening 21 and coacts with the side wall 14 to define an upwardly extending air discharge opening 24, and a lower portion 25 that extends below the opening 21 and coacts with the upper end 20 of the inner wall to define a downwardly extending opening 26. A passageway is effectively defined between the rail 22 and the lip 19 and upper end 20 of the inner wall through which foreign elements that may be introduced into the opening 24 may pass out through the opening 26. As illustrated, a foreign element entering the upper opening 24 would take the position as that designated by the numeral 27, pass downwardly in front of the opening 21 and take the position as that designated by the numeral 28, pass downwardly to a position as that indicated by the numeral 29, and be discharged out the opening 26 as that indicated by the numeral 30. The rail 22 is secured to the upper end 20 of the inner wall 15 and the lip member 19 by a plurality of web plates 31 longitudinally spaced from each other as illustrated.

The inner surface of the rail 23 may be suitably formed to enhance the flow of air upwardly out the opening 24 after it has been discharged through the opening 21 in the manner shown or in any other suitable manner. Thus, the embodiment of FIGS. 2, 3 and 4 illustrates the invention which would prevent foreign elements from entering the opening 21 and the air duct 16. It will be appreciated that the opening 24 and its distance from the opening 21 is sized to prevent a person having a normal sized hand from deliberately reaching through the opening 24 to introduce a foreign element into the opening 21. Similarly, the lower opening 26 and its spacing from the opening 21 would preclude a person from inserting an article upwardly and into the opening 21.

A second embodiment of the invention is shown in FIGS. 5–9, wherein the outer wall of the vehicle is designated as 32 and the inner wall as 33. A layer of insulation 34 is arranged against the inside of the outer wall 32. A window opening 35 is provided in the outer wall. In order to reinforce the outer wall 32 at the window level, a horizontally extending channel member 36 is secured to the outer wall in suitable fashion, and which includes a lower flange 37 and an upper attaching flange 38, the latter of which terminates along the window opening 35. A structural member 39, extending along the side wall, includes an upper flange 40 abutting against and secured to the flange 38 of the channel member 36, a horizontally extending portion 41, an inclined portion 42, and a lower flange 43 that abuts against and is secured to the inner end of the channel 36. The horizontal portion 41 forms a support for a window molding 44 of rubber or the like which is fitted over the upper ends of the flanges 38 and 40 and about the window opening 35, and is capable of holding dual panel glass 45.

The window sill structure of this embodiment is generally indicated by the numeral 46, and includes generally a V-shaped mounting bar 47, a plurality of web plates 48, a molding 49, and a rail 50.

The V-shaped bar 47 includes an upper portion 51 downwardly and inwardly inclined in relation to the window 45 and the side wall 32, and a lower portion 52 that is upwardly and inwardly inclined toward the outer wall 32. The upper and lower portions 51 and 52 are integrally joined at 53, and provided along the joining area with a plurality of fastener holes 54 that receive fasteners 55. The fasteners 55 may be threadedly received in the channel member 36 for securing the bar 47 to the outer wall of the vehicle. The bar 47 is also provided with a plurality of slots 56, each of which receives a connecting ear 57 of a web plate 48. After the ear 57 is inserted into the slot, the upper and lower ends 57a and 57b are bent in opposite directions to lock the connecting ear and web plate to the bar.

The lower end of each web plate is supported on the upper edge of the inner wall 33, and is formed with an opening 58 with opposed locking tabs 59 for receiving the molding 49, which is appropriately provided with opposed locking grooves for the locking tabs 59 and a groove for receiving the upper end of the inner wall 33. The molding may be of rubber or any suitable material. Thus, the web plates 48 are essentially supported by both the inner and outer walls.

The inner end of each plate 48 is provided at the upper end with a fixed detent 60 for receiving thereover the upper, hook-shaped end 61 of the rail 50, and a lower movable detent 62 for selectively engaging and locking in a lower hooked portion 63 of the rail 50. The movable detent 62 is carried on a lever 64 that is pivoted to a pin 65 connected to the web plate, which lever 64 coacts with a struck portion 66 that is normally displaced from the surface of the web plate to lock the lever 64 in the position shown in FIG. 6. Thus, the rail 50 may be mounted on the plurality of web plates by hooking the upper end over the fixed detent 69, with the movable detents 62 arranged in a position similar to that shown in FIG. 7, and then bringing the lower hooked end 63 of the rail into position to receive the detents 62 when the latter are swung into the positions shown in FIG. 6. Thereafter, if it is desired to remove the rail 50, such can be done by depressing the struck portion 66 to a position so that it will not interfere with movement of the lever 64, whereby movement of the lever and detent 62 to a position, such as shown in FIG. 7, will permit removal of the rail 50.

The window sill structure of FIGS. 5–9 will operate like that of the embodiment of FIGS. 2–4. In the embodiment of FIGS. 5–9, an air duct 67 is defined between the inner and outer walls 33 and 32, respectively, the upper end of which is provided with an opening 68 between the upper end of the inner wall and the channel member 36 and bar 47. A further air discharge opening 69 is defined by the upper end of the rail 50, the inclined upper portion 51 of the bar 47, and the structural member 39, while a downwardly extending foreign element opening 70 is defined by the lower end of the rail 50 and the inner wall 33. Air passing upwardly out of the air duct 67 passes through the outlet or opening 68 and is further deflected upwardly by the rail 50 and out the upwardly extending opening 69 to pass along the inner sides of the windows 45 and the corresponding side wall of the vehicle. The dropping of any foreign elements into the opening 69 will cause same to be deflected by the upper inclined portion 51 of the bar 47 to a point in the channel defined by the rail 50 and the inwardly spaced parts so that it will pass on downwardly through the lower discharge opening 70 and onto the floor of the vehicle. It is possible that the elements would fall into the lap of a person seated adjacent the window and thereby indicate to the person that it is not possible to introduce foreign elements into the air distribution system of the vehicle. The window sill embodiments of the invention may be applied to existing vehicles or to newly built vehicles to operate with equal success.

It will be understood that modifications and variations may be effected without departing from the scope of the novel concepts of the present invention, but it is understood that this application is to be limited only by the scope of the appended claims.

The invention is hereby claimed as follows:

1. In a vehicle having a floor, a ceiling, and front, back and side walls and windows in the side walls at viewing height for a person in seated position and wherein the side walls are hollow to define air passageways with an opening at the upper end along the lower end of the windows, and means for preventing foreign elements from dropping into said opening and air passageways, said means including a substantially upstanding elongated rail arranged laterally adjacent and overlying said opening and defining with the side wall an upper opening and lower opening, whereby elements dropped in the upper opening will bypass the wall opening and be discharged through said lower opening to fall to the floor.

2. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including a rail along the outer wall having a lip extending over the air duct and coacting with a flange along the inner rail to define a slotted opening facing substantially along a horizontal axis, and means covering said opening but in spaced relation therefrom defining with the rail an upwardly extending air discharge opening below the windows and with the flange a downwardly extending opening for discharging back to the floor foreign elements dropped into said upwardly extending air discharge opening.

3. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including means extending inwardly from the outer wall and defining with the upper end of the inner wall a generally horizontally extending air discharge opening, and an elongated rail mounted in spaced relation to said opening and extending thereabove to define with said inwardly extending means an upwardly exending air discharge opening below the windows and therebelow to define with said inner wall a downwardly extending opening for discharging back to the floor foreign elements dropped into said upwardly extending air discharge opening.

4. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including deflector means extending inwardly from the outer wall and terminating above and substantially in alignment with the upper end of the inner wall to define therewith a generally horizontally extending air discharge opening, and an elongated rail mounted in spaced relation to said opening and extending thereabove to define with said inwardly extending means an upwardly extending air discharge opening below the windows and therebelow to define with said inner wall a downwardly extending opening for discharging back to the floor foreign elements dropped into said upwardly extending air discharge opening.

5. In a vehicle having a floor, a ceiling, and front, back and side walls and windows in the side walls at viewing height of a person seated therealongside and wherein the side walls include inner and outer upstanding panels defining an elongated air duct, and means at the upper end for discharging air and preventing foreign elements from entering said air duct, said means including deflector means extending inwardly from the outer wall and terminating above and substantially in alignment with the upper end of the inner wall to define therewith a generally horizontally extending air discharge opening, said deflector means having an upper surface inclined downwardly from said outer wall, and an elongated rail mounted in spaced relation to said opening and extending thereabove to define with said inwardly extending means an upwardly extending air discharge opening below the windows and therebelow to define with said inner wall a downwardly extending opening for discharging back to the floor foreign elements dropped into said upwardly extending air discharge opening.

6. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including deflector means extending inwardly from the outer wall and terminating above and substantially in alignment with the upper end of the inner wall to define therewith a generally horizontally extending air discharge opening, said deflector means having an upper surface inclined downwardly from said outer wall and a lower surface inclined upwardly from said outer wall, and an elongated rail mounted in spaced relation to said opening and extending thereabove to define with said inwardly extending means an upwardly extending air discharge opening below the windows and therebelow to define with said inner wall a downwardly extending opening for discharging back to the floor foreign elements dropped into said upwardly extending air discharge opening.

7. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including a horizontally extending substantially V-shaped bar secured to the outer wall in spaced relation thereto, said bar including an upper portion inclined downwardly from said outer wall and a lower portion inclined upwardly from the outer wall, wherein the intersection of the upper and lower portions is positioned above and substantially in alignment with the upper end of the inner wall to define therewith a generally horizontally extending air discharge opening, and an elongated rail mounted in spaced relation to said opening and extending thereabove to define with said upper portion an upwardly extending air discharge opening below the windows and therebelow to define with said inner wall a downwardly extending opening for discharging back to the floor foreign elements dropped into said upwardly extending air discharge opening.

8. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including a horizontally extending substantially V-shaped bar secured to the outer wall in spaced relation thereto, said bar including an upper portion inclined downwardly from said outer wall and a lower portion inclined upwardly from the outer wall, wherein the intersection of the upper and lower portions is positioned above and substantially in alignment with the upper end of the inner wall to define therewith a generally horizontally extending air discharge opening, an elongated rail in spaced relation to said opening and extending thereabove to define with said upper portion an upwardly extending air discharge opening below the windows and therebelow to define with said inner wall a downwardly extending opening for discharging back to the floor foreign elements dropped into said upwardly extending air discharge opening, and means mounting said rail to said bar.

9. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including a horizontally extending substantially V-shaped bar secured to the outer wall in spaced relation thereto, said bar including an upper portion inclined downwardly from said outer wall and a lower portion inclined upwardly from the outer wall, wherein the intersection of the upper and lower portions is positioned above and substantially in alignment with the upper end of the inner wall to define therewith a generally horizontally extending air discharge opening, an elongated rail in spaced relation to said opening and extending thereabove to define with said upper portion an upwardly extending air discharge opening below the windows and therebelow to define with said inner wall a downwardly extending opening for discharging back to the floor foreign elements dropped into said upwardly extending air discharge opening, and means mounting said rail to said bar, said means including a plurality of web plates connected at one end to said bar and having the rail removably mounted thereon at the other end.

10. In a vehicle having a floor, a ceiling, and front, back and side walls and windows in the side walls at viewing height for a person seated therealongside and wherein the side walls include inner and outer upstanding panels defining an elongated air duct, and means at the upper end for discharging air and preventing foreign elements from entering said air duct, said means including a horizontally extending substantially V-shaped bar secured to the outer wall in spaced relation thereto, said bar including an upper portion inclined downwardly from said outer wall and a lower portion inclined upwardly from the outer wall, wherein the intersection of the upper and lower portions is positioned above and substantially in alignment with the upper end of the inner wall to define therewith a generally horizontally extending air discharge opening, an elongated rail in spaced relation to said opening and extending thereabove to define with said upper portion an upwardly extending air discharge opening below the windows and therebelow to define with said inner wall a downwardly extending opening for discharging back to the floor foreign elements dropped into said upwardly extending air discharge opening, and means mounting said rail to said bar, said means including a plurality of web plates, each plate having an ear at the inner end extending through a slot in said bar and twisted to lock same to the bar and having means at the outer end for removably attaching said rail thereto.

References Cited
UNITED STATES PATENTS

| | | | |
|---|---|---|---|
| 2,176,143 | 10/1939 | Miller | 98—2 |
| 2,774,227 | 12/1956 | Schjolin | 98—2.5 |
| 3,208,368 | 9/1965 | Peras | 98—2.5 |
| 3,289,564 | 12/1966 | Castelet | 98—2 |

MEYER PERLIN, *Primary Examiner.*